May 3, 1927.
L. P. HYNES
1,627,180
MOTOR SYSTEM FOR CAR DOORS
Filed Feb. 10, 1919   3 Sheets-Sheet 3
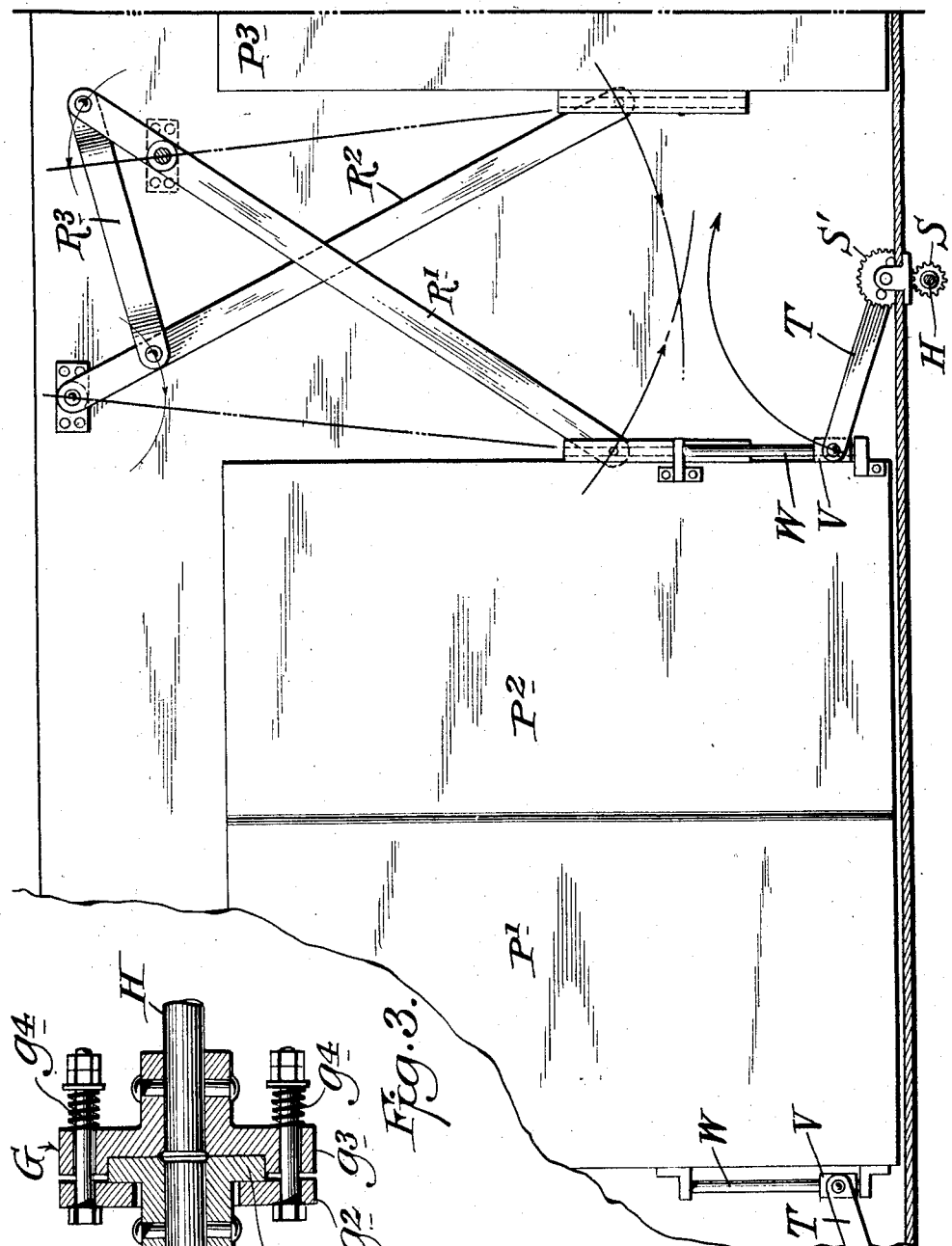
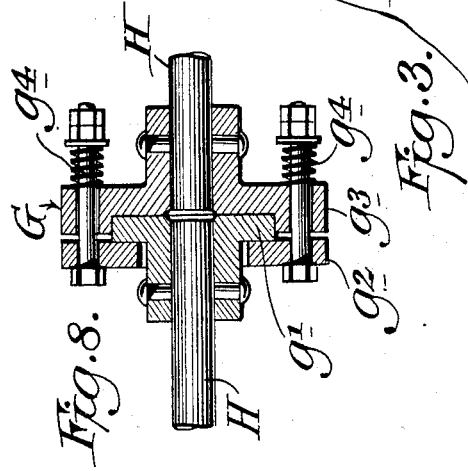
Inventor,
Lee P. Hynes
By E. M. Bentley
Attorney.

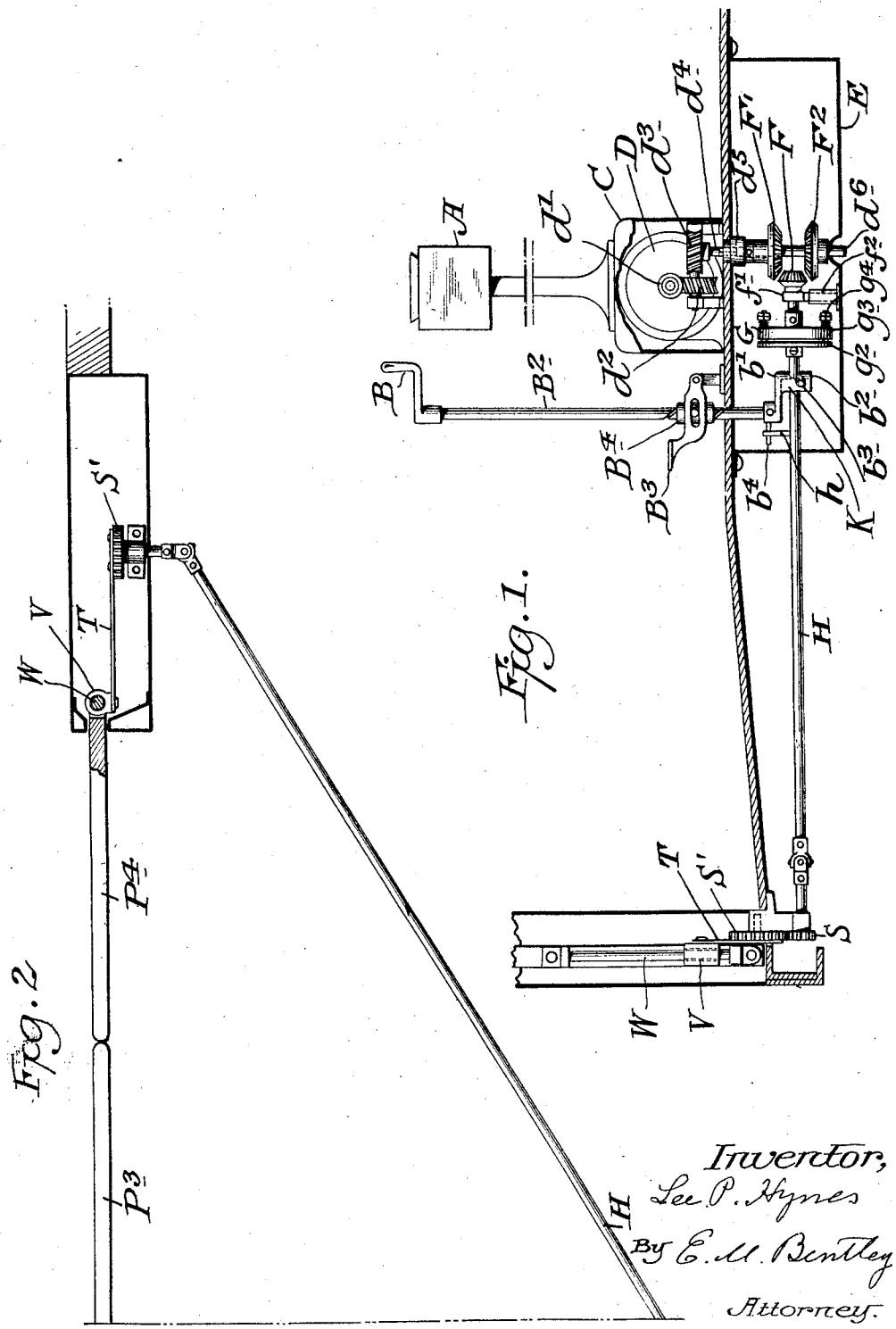

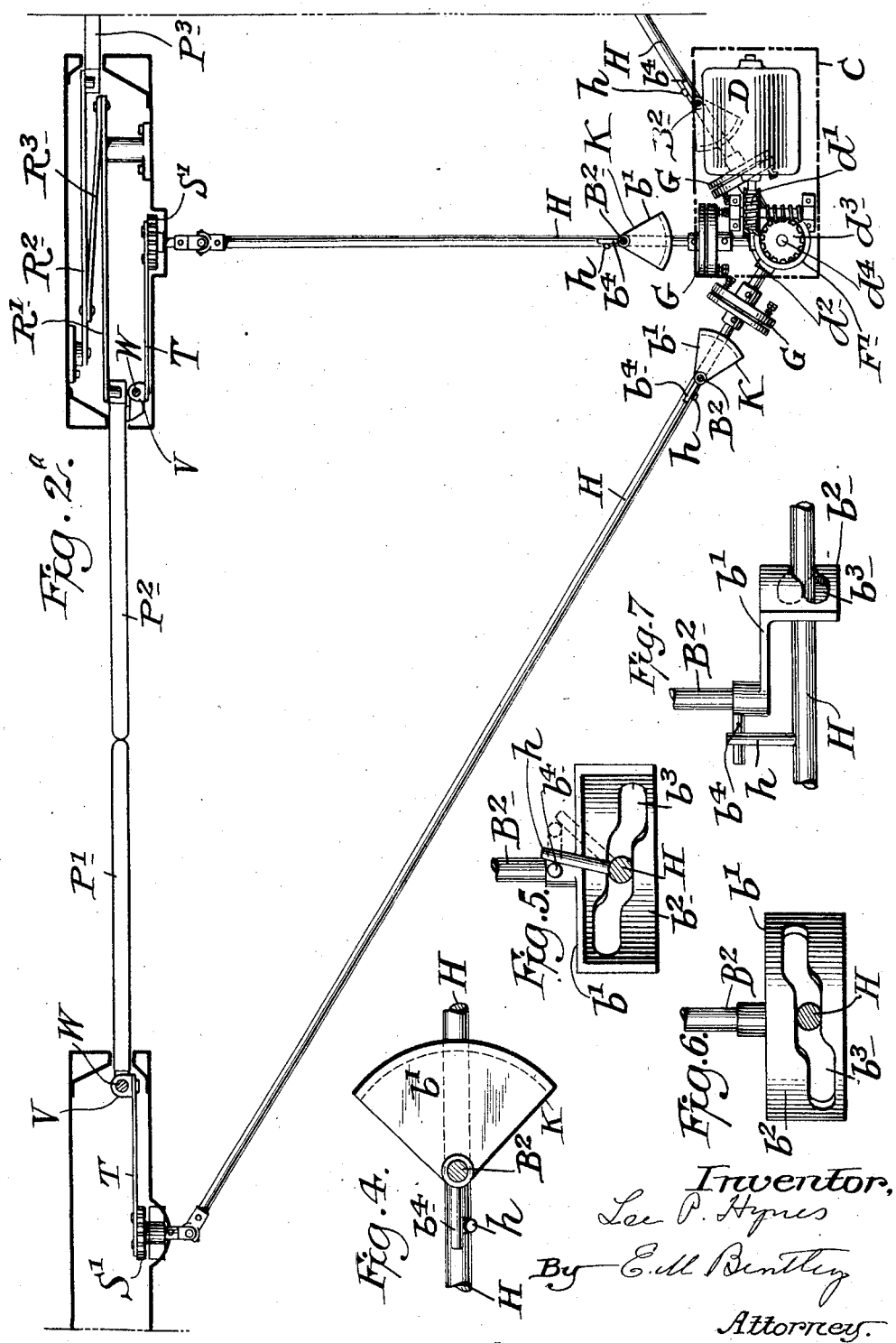

Patented May 3, 1927.

1,627,180

UNITED STATES PATENT OFFICE.

LEE P. HYNES, OF ALBANY, NEW YORK, ASSIGNOR TO CONSOLIDATED CAR HEATING COMPANY, OF ALBANY, NEW YORK, A CORPORATION OF WEST VIRGINIA.

MOTOR SYSTEM FOR CAR DOORS.

Application filed February 10, 1919. Serial No. 276,186.

For a detailed description of the present form of my invention, reference may be had to the following specification and to the accompanying drawings forming a part thereof; wherein—

Fig. 1 is a transverse section of a car showing my apparatus;

Figures 2 and 2ᵃ combined, illustrate a complete plan thereof;

Fig. 3 shows the between-door connections;

Figs. 4, 5, 6 and 7 show the enlarged details of the automatic controller and

Fig. 8 those of the slip joint.

My invention relates to motor operation of car doors. In practice these have been heretofore worked by pneumatic engines although electric motors therefor have been suggested. My purpose is to make practicable their operation electrically. To that end I employ a single electric motor having a constant direction and speed and combine therewith a plurality of mechanical transmitters extending from the single motor to each one of several doors or groups of doors in the car. Each transmitter is capable of individual connection to and disconnection from the motor for each direction of door movement. The connection is made manually and the disconnection automatically. I also provide in each transmitter a slip joint. This joint is located outside of the automatic disconnecting agency, whereby that agency may remain in fixed phase-relation to the door and act only on the completion of the door stroke without disturbance by slippage of the shaft.

I illustrate my invention by its application to a center-door car—four doors on each side—the ticket box and door-control station being located at the center opposite the doors.

In Fig. 1 A represents the ticket box and B one of the several door-control handles adjacent thereto. Or a treadle B³ may be used to rotate spindle B² by a long-pitch screw nut B⁴ on the spindle. The base of the ticket-box stand is a box C containing an electric motor D. On the motor-shaft is screw $d^1$ engaging a worm-wheel $d^2$ which, in turn, drives a second worm-wheel $d^3$ on vertical shaft $d^4$. By this large speed reduction immediately at the motor—e. g.—from 1200 down to 8 R. P. M.—I secure for all of the transmitters a practical speed commensurate with the short run, low speed and high torque required for the door and the efficient high speed of the non-stopping, non-reversing motor. In addition it simplifies the automatic control by giving the disconnector cam-pin a short travel—I give it less than one turn—as will be explained later. The shaft $d^4$ has a squared end fitting loosely in a socket $d^5$ on the continuation shaft $d^6$ of the sub-floor apparatus in box E. Thus the motor is inside the car and readily separable for repair and replacement from the outside mechanism. On shaft $d^6$ are two bevel gears F¹ and F², either one of which may be engaged at will by the normally disengaged pinion F, which is guided vertically by an eye-bearing $f^1$ having a stem sliding in a tube $f^2$. Pinion F is the terminal of horizontal door-shaft H. and G is the slip joint. As appears in Fig. 8 the slip joint comprises a disc $g^1$ on one portion of shaft H which is gripped between discs $g^2$ and $g^3$ on the other portion. The gripping pressure is adjusted by the spring-bolts $g^4$. K is the controller, worked manually by the operator, to engage pinion F with either one of the miter gears, and automatically by the door-shaft to disengage it therefrom. It may also be worked manually at any point in the travel of the door to stop or reverse its motion. It is located on shaft H between the slip joint and the door, being thus kept in fixed phase relation to the door regardless of slippage at the joint. The controller details appear in Figs. 4, 5, 6 and 7. The operator's spindle B² carries at its lower end a sector $b^1$ with a depending flange $b^2$ wherein is cut a three-level slot $b^3$ traversed by shaft H and forming a bearing therefor. Normally the shaft H rests in the mid-level part of the slot which brings the pinion F into its neutral position out of engagement with either miter gear. Obviously the turning of the operator's spindle to right or left will bring shaft H into the upper or the lower level of the slot, thereby raising pinion F to engage the upper bevel gear F¹ or lowering it to engage the lower bevel gear F². According to the upper or the lower gear engagement of pinion F, the door shaft H will start in its door-closing or its door-opening direction of rotation, assuming that the motor has the appropriate direction. On the hub of sector $b^1$ is a stud $b^4$ that stands in the path of a cam-pin $h$ that projects radially from shaft H. When the door reaches the end of its run this cam-pin (which by virtue of the aforesaid reducing gear makes less than one complete turn for each door stroke) has revolved far enough to strike stud $b^4$ and turn the sector $b^1$ back to its neutral position from which position it had been moved by the operator to start the door on its run. Since this engagement of the cam-pin with stud $b^4$ only occurs at the end of the door run, the sector $b^1$ is free during said run to be turned manually by the operator either to stop or to reverse the door. After the cam-pin has brought the sector to neutral, the next succeeding movement of the sector will of course be in the opposite direction, turning the stud $b^4$ away from cam-pin $h$, to either reopen the door if it has been closed or reclose it if it has been opened by the preceding sector displacement which the cam-pin has automatically restored to neutral.

The door shaft H will be duplicated for each door or group of doors, as appears in the plan view in Fig. 2. Each shaft will have its own pinion F (all pinions cooperating with the single set of bevel gears $F^1$ and $F^2$) also its own slip joint G and its own controller K. Every door, or group of doors, can therefore be operated independently of the other by the one motor which runs continuously so long as its services are required, its inertia aiding instead of retarding the start of the door. The door-shafts H radiate from the center of the car to the several doors. In this case doors $P^1$ and $P^4$ are worked individually $P^2$ and $P^3$ as a group. The diagonal shafts H include gimbal joints and each terminates in a spur pinion S engaging a gear wheel $S^1$ on the shaft of an ordinary door-operating arm T, as is particularly shown in Fig. 3. In that figure the arm T operated by gear wheel $S^1$ is jointed at its outer end to slide V on a rod W secured to and parallel with one edge of the door. The doors $P^2$ and $P^3$ are interconnected in a known manner so that the operation of one will involve the simultaneous operation of the other. Fig. 2 shows $P^2$ as the one worked by shaft H and its interconnection with $P^3$ is shown in Fig. 3, the levers $R^1$, $R^2$ connected to the respective doors being reversely cross-connected by a link $R^3$.

The doors when closed will be locked in the usual way by the arm T coming nearly to a horizontal position in dead-center relation to the door. If the door, in closing, encounters an obstruction, the joint G will slip until the obstruction is removed. The shaft which works the cam-pin $h$ to give it its function as a disconnector is reduced in speed with respect to the motor-shaft and also with respect to the shaft of the door arm T. Hence although the arm turns less than 180 degrees, the cam-pin turns nearly 360 degrees and is therefore a convenient member to effect in a simple way the automatic disconnection of the door from the motor at the end of the door run. While some other given ratio of time relation between the door and disconnector might be employed, this one-to-one relation between door-stroke and pin-stroke tends to simplify the apparatus.

What I claim as new and desire to secure by Letters Patent is:

1. The combination with a car door, of an electric motor on the car in constant operation, speed-reducing gearing, a reversible door-operating shaft, manual connecting means for engaging said shaft with said gearing for either opening or closing the door, and automatic disconnecting means for disengaging the said shaft at the end of the door run.

2. The combination with a plurality of car doors, of an electric motor on the car in constant operation, speed reducing gearing driven by the motor, a reversible door-operating shaft between each of the several doors and the said gearing, manual connecting means for engaging each shaft with the said gearing for either opening or closing the corresponding door, and automatic disconnecting means for disconnecting each shaft.

3. The combination with a car door, of an electric motor on the car in constant operation in one direction, speed-reducing gearing, a reversible door-operating shaft, manual connecting means for engaging said shaft with said gearing for either opening or closing the door, automatic disconnecting means for disengaging the said shaft at the end of the door-run in either direction, and a slip joint between the door and the motor independent of said automatic means.

4. The combination with a door of a motor having a constant direction of rotation, door operating means, a controller normally maintaining said motor and said door operating means in disconnected relation, said controller being located in a fixed position relative to the door, manual means for operating said controller whereby the motor and door operating means are placed in connected relation, and means operable automatically at the end of the run of the door to restore said controller to its normal position.

5. The combination with a door of a motor having a constant direction of rotation, door operaitng means, a controller normally maintaining said motor and said door operating means in disconnected relation, a manually operated spindle upon which said controller is mounted whereby the motor and door operating means may be placed in connected relation, said spindle being located in a fixed position relative to said door, and means operable automatically at the end of the run of the door to restore said controller to its normal position.

6. The combination with a car door of an electric motor having a constant direction of rotation, an oscillatory actuating arm connected with the door shafting between the motor and said arm, and a reversible connector under the control of the operator engaging said shafting intermediate between said arm and said motor.

7. The combination with a car door, of an electric motor within the car running constantly in the same direction, a shaft outside the car driven by said motor and also running constantly in the same direction, a reversible rotating door operating shaft disposed at an angle to the motor driven shaft and positioned to be driven by the latter, and a connector positively engaging the motor driven shaft operative to effect reversal of the direction of rotation thereof.

8. The combination with a car door of a motor within the car having a constant direction of rotation, a vertical section of shafting operated by the motor, a door operating shaft positioned to be driven by said vertical shafting, and a manually operated controller normally holding said door operating shaft out of engagement with said vertical shafting and having means for bodily moving the door operating shaft into and out of engagement with said vertical shafting.

9. The combination with a car door of a motor, a rotatable door operating shaft, driving means for said shaft actuated by said motor, and a manually operable control device for bodily moving said door operating shaft to connect it with said driving means and having means for normally maintaining said shaft and driving means in disconnected relation.

10. The combination with a car door of an electric motor having a constant direction of rotation, shafting between said motor and the door including relief means, a reversible connector positively engaging said shafting between the door and the motor and controlled by the operator, and means for automatically actuating said connector at the end of each run of the door.

11. The combination with a plurality of car doors located at different points on a car of an electric motor having a constant direction of rotation located midway of the car, mechanical transmitting devices extending transversely of the car between the motor and each of the respective doors and a reversible connector controlled by the operator between each of said doors and the motor.

12. The combination with a plurality of car doors of an electric motor located midway of the car, diagonal shafts between the motor and each of the respective doors and an individual reversible connector controlled by the operator between each of said doors and the motor.

13. The combination with two doors located a distance apart on the same side of a car, a motor, shafts driven by the motor and operated by the respective doors, and individual reversible connectors for the respective shafts controlled by the operator, each reversible connector being located between the motor and a door.

14. The combination with a plurality of car doors of a single electric motor on the car having a constant direction of rotation, shafting on the car between said motor and each of the respective doors, an individual reversible connector controlled by the operator between the motor and each of the respective doors and individual automatic devices controlled by the shafting to the respective doors for disconnecting it from the motor at the end of the travel of the said respective doors.

15. The combination with a plurality of car doors of a single electric motor on the car having a constant direction of rotation, an individual mechanical transmitter on the car between each of the respective doors and the motor containing a reversible connector controlled by the operator, an individual disconnecting device between each door and the motor means operated automatically at the end of the travel of the door in either direction for actuating said disconnecting device, and a slip joint between each door and the motor independent of the said automatic disconnecting device.

16. The combination with a car door of an electric motor having a constant direction of rotation, transmitting mechanism between the door and the motor, a reducing gear between said door and the motor, a reversible connector positively engaging said transmitting mechanism and controlled by the operator, and means for automatically actuating said connector at the end of each run of the door.

17. The combination with a plurality of car doors of a motor having a constant direction of rotation, a shaft operated by the motor through a reducing gear, reversibly rotatable individual transmitting mechanisms between said shaft and each of the respective doors, and means for connecting, disconnecting and reversing the respective transmitting members of said mechanisms.

18. The combination with a plurality of car doors of a single motor, a shaft driven by said motor through a reducing gear, transmitting mechanisms between said shaft and each of the respective doors, and means controlled by the operator for connecting, disconnecting and reversing the respective transmitting mechanisms.

19. The combination with a car door of a motor therefor, a reverse gearing driven by said motor, a door operating shaft connected at one end with the door and having the other end movably supported contiguous to said gearing, and means positively engaging said shaft for shifting the movable end thereof into engagement with said gearing, said shifting means having means for normally maintaining said movable end in a neutral position.

20. The combination with a car door of an electric motor, transmitting mechanism containing bevel gearing between said motor and the door, a reversible mechanical connector between the door and the motor controlled by the operator, an automatic disconnector controlled by transmitting mechanism and a slip joint independent of said disconnector.

21. The combination with a car door of an electric motor, bevel gearing driven by the motor through a reducing gear, a shaft and pinion reversibly connectible to said gearing and automatic means positively engaging said shaft to disconnect it from said gearing at the end of a predetermined number of rotations of the shaft.

22. The combination with a plurality of car doors of a single electric motor on the car having a constant direction of rotation, a reversible mechanical connector also on the car between each door and the motor, a disconnector operating at the end of the door travel in either direction and means for permitting the motor to continue its rotation in the event of the door being obstructed.

23. The combination with a car door of an electric motor having a continuous direction of rotation, a mechanical transmitter between the door and motor containing a reversible member and a disconnector operated by said motor through a reducing gear and having a fixed time relation to the door movement.

24. The combination with a car door of a motor having a continuous speed of direction and rotation, power transmitting means driven by the motor through reducing gearing, a reversibly rotatable shaft between the power transmitting means and the door and controlling means for moving said shaft to connect and disconnect it with respect to the power transmitting means, whereby the operation of said shaft is influenced by said reducing gearing.

25. The combination with a plurality of car doors of a single electric motor on the car, a reducing gear driven by said motor, individual mechanical transmitters containing a reversible member between each of the several doors and the low-speed side of said gear, and individual disconnectors, one for each shaft, and means whereby each disconnector is operated at the end of the travel in either direction, of the door with which it is associated.

26. The combination with a car door of a single electric motor, a pair of oppositely acting members driven by the motor, a transmitter shaft extending from said members to the door and bodily movable for connection with either one of said members, a disconnector having means for imparting bodily movement to said shaft, and complemental means carried by said shaft and said disconnector for automatically restoring the shaft to neutral position, said complemental means being automatically actuated at the end of the door travel in either direction.

27. The combination with a car door of a continuously running motor, a pair of oppositely bevel gears driven thereby, a door operating shaft, a pinion connected to the door operating shaft and adapted to engage either one of said gears, and an automatic disconnector therefor actuated at the end of the door travel in either direction, said disconnector having a positive engagement with said door operating shaft.

28. The combination with a plurality of car doors of a single continuously-running motor therefor, oppositely acting members driven by said motor and individual transmitters extending from each door to the said members and connectable with either one of them.

29. The combination with a plurality of car doors of a continuously running motor, a pair of oppositely acting bevel gears driven by the motor and individual pinions connected to the several doors and connectable with either one of said gears.

30. The combination with a plurality of car doors of a single continuously running and centrally located motor, individual transmitters radiating from said motor to the respective doors, and means for independently and reversibly connecting the several transmitters with the motor.

31. The combination with a plurality of car doors of a single continuously running and centrally located motor, a pair of oppositely acting members driven by the motor, and radiating transmitters extending to the several doors and connectable with either of said two members.

32. The combination with a plurality of car doors of a single motor therefor continuously running and located at an intermediate point in the car with respect to said doors, a vertical shaft driven by the motor, speed reducing gearing for securing single strokes of the door, horizontal bevel gears driven by the motor and a series of vertically shiftable pinions connecting with the several doors and movable to engage with either one of said gears.

33. The combination with a plurality of car doors of a constantly running motor therefor centrally located with respect to the doors, transmitters radiating from the motor to the respective doors, a connector between each door, and the motor workable at will by the operator, and corresponding disconnectors workable automatically by the actuation of the respective transmitters, and means for permitting the motor to continue its operation in the event of a door being blocked.

34. The combination with a car door, of a rotary operating arm therefor moving in the plane of the door at the rear thereof, a continuously operating motor, a shaft connecting said motor and said arm, and means for reversibly controlling the connection and disconnection of said shaft and said motor.

35. The combination with a car door, of a continuously running motor therefor, a slow speed shaft between the door and the motor, a reversible door operating shaft operated by the first mentioned shaft, and an automatic disconnector positively engaging said door-operating shaft and operated thereby.

36. The combination with a plurality of car doors of a single motor centrally located on the car, reversibly rotatable transmitting shafts radiating from a position contiguous to the motor to the respective doors, and individual controllers for the respective shafts grouped at a common controlling station.

37. The combination with a plurality of car doors of a single constantly operating motor therefor centrally located on the car, reversibly rotatable transmitters radiating from a position contiguous to the motor to the respective doors, and a series of independent connecting and disconnecting devices engaging the motor ends of the respective transmitters and grouped at a common controlling station.

38. The combination with a plurality of car doors of a constantly operating motor therefor centrally located, a series of reversible transmitters radiating from a position contiguous to the motor to the respective doors and a series of controlling devices for the respective transmitters grouped together and each comprising a connector subject to the will of the operator, a disconnector subject to the travel of the door, and means whereby the motor may continue in operation in the event of the door being blocked.

39. The combination with a plurality of car doors of a single constantly operating motor, a door operating shaft, worm and screw gearing between the motor and said shaft, individual door operating means radiating from said shaft to the several doors, and means for reversibly connecting the respective door operating shafts to said gearing.

LEE P. HYNES.